United States Patent
Diaz Garcia

(10) Patent No.: US 11,494,429 B2
(45) Date of Patent: Nov. 8, 2022

(54) CATEGORIZATION TO RELATED CATEGORIES

(71) Applicant: Hewlett-Packard Development Company, L.P., Spring, TX (US)

(72) Inventor: Raul Diaz Garcia, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/047,435

(22) PCT Filed: Oct. 9, 2018

(86) PCT No.: PCT/US2018/055057
§ 371 (c)(1),
(2) Date: Oct. 14, 2020

(87) PCT Pub. No.: WO2020/076309
PCT Pub. Date: Apr. 16, 2020

(65) Prior Publication Data
US 2021/0224314 A1 Jul. 22, 2021

(51) Int. Cl.
*G06F 16/00* (2019.01)
*G06F 16/55* (2019.01)
*G06N 20/00* (2019.01)

(52) U.S. Cl.
CPC ............. *G06F 16/55* (2019.01); *G06N 20/00* (2019.01)

(58) Field of Classification Search
CPC ........ G06F 16/55; G06N 20/00; G06V 20/68; G06V 30/194; G06K 9/628
See application file for complete search history.

(56) References Cited

U.S. PATENT DOCUMENTS

| | | | |
|---|---|---|---|
| 5,268,684 A | 12/1993 | Allen et al. | |
| 7,912,246 B1 | 3/2011 | Moon et al. | |
| 8,065,246 B2 | 11/2011 | Bouchard | |
| 8,489,603 B1 * | 7/2013 | Weissgerber | G06F 16/285 707/804 |
| 9,830,534 B1 * | 11/2017 | Ravichandran | G06V 10/42 |
| 2004/0019601 A1 * | 1/2004 | Gates | G06F 16/355 707/999.102 |

(Continued)

OTHER PUBLICATIONS

Arash Sangari et al, "Convergence Analysis of Two Loss Functions in Soft-Max Regression", IEEE Transactions on Signal Processing, vol. 64, No. 5, Mar. 1, 2016, 9 pgs.

(Continued)

*Primary Examiner* — Jared M Bibbee
(74) *Attorney, Agent, or Firm* — Fabian VanCott

(57) ABSTRACT

A method of training a machine learning system, the method including: training the machine learning system in category identification against a test case wherein the machine learning system outputs an answer vector and the answer vector is compared against a control vector where the control vector comprising three different values, the values comprising: a first value for a matching category for the test case; a second value for a non-matching category for the test case; and a third value for a first category related to the matching category for the test case wherein the third value differs from the first value differs from the second value.

20 Claims, 6 Drawing Sheets

(56) References Cited

U.S. PATENT DOCUMENTS

| | | | |
|---|---|---|---|
| 2004/0208376 A1* | 10/2004 | Shi | G06V 10/443 |
| | | | 382/218 |
| 2006/0248054 A1* | 11/2006 | Kirshenbaum | G06F 16/35 |
| 2009/0119095 A1* | 5/2009 | Beggelman | G06F 40/30 |
| | | | 704/9 |
| 2014/0306953 A1* | 10/2014 | Morato | G06T 17/00 |
| | | | 345/420 |
| 2017/0301002 A1* | 10/2017 | Wilkinson | G06Q 30/0631 |
| 2019/0119095 A1 | 4/2019 | Thurin et al. | |

OTHER PUBLICATIONS

Assaad Moawad, "Encoding concepts, categories and classes for neural networks", Jul. 30, 2018, 6 pgs, https://medium.com/datathings/encoding-concepts-categories-and-classes-for-neural-networks-4a673346dc15.

Cheng, Jianlin, "A Neural Network Approach to Ordinal Regression", http://arxiv.org/abs/0704.1028. Apr. 8, 2007, 8 pgs.

Fu H et al, Deep Ordinal Regression Network for Monocular Depth Estimation, IEEE Conference on Computer Vision and Pattern Recognition (CVPR), 2018, 10 pgs.

Gutierrez et al, "Ordinal Regression Methods: Survey and Experimental Study", IEEE Transactions on Knowledge and Data Engineering, Jul. 2015, 21 pgs.

Liu et al, "A Constrained Deep Neural Network for Ordinal Regression", IEEE Conference on Computer Vision and Pattern Recognition (CVPR), 2018, 9 pgs.

Niu et al, "Ordinal Regression with Multiple Output Cnn for Age Estimation", IEEE Conference on Computer Vision and Pattern Recognition, 4920-4928, 2016.

\* cited by examiner

240 CategoryVector =
(Canidae,
    Vulpini,
        Vulpes zerda,
        Vulpes cana,
        Vlupese chama,
    Canini,
        Canis familiaris,
            Great Dane,
            Shih Tzu,
            Beagle,
        Canis lupus,
        Canis latrans)

222 ControlVector(Shih Tzu) =
(1,
  0.1,
  0,
  0,
  0,
  1,
  1,
    0.4,
    1,
    0.4,
  0.2,
  0.2)

*Fig. 5*

CATEGORIZATION TO RELATED CATEGORIES

BACKGROUND

People seem to have an inherent ability to categorize. Human categorization is complex and not well understood. This has made developing methods of machine based categorization challenging. As a result, machine based categorization has taken routes different from human categorization. Today, for example, society continues to use the inability of machines to recognize distorted letters and numbers as ways to limit access to systems to people. Such distorted letters and numbers may be a "Completely Automated Public Turing test to tell Computers and Humans Apart" or CAPTCHA.

BRIEF DESCRIPTION OF THE DRAWINGS

The accompanying drawings illustrate various examples of the principles described herein and are a part of the specification. The illustrated examples do not limit the scope of the claims.

FIG. 5 shows an example of mapping preexisting category information into the category vector and control vector according to an example consistent with this specification.

DETAILED DESCRIPTION

Figure 1:
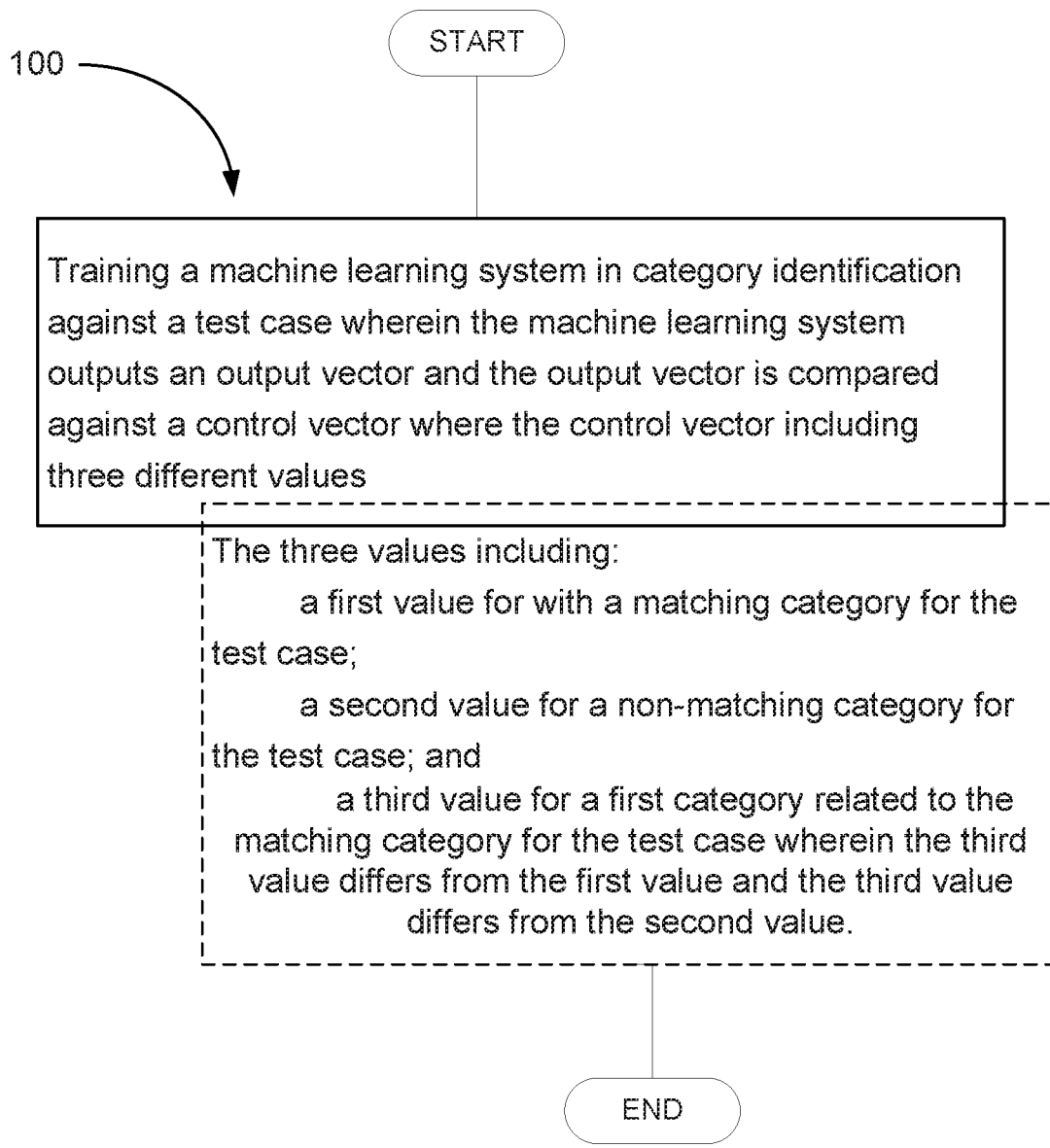
FIG. 1 shows a method of training a machine learning system according to an example consistent with this specification.

One challenge with how machines perform categorization is the quality of the wrong answers machines produce. Not all incorrect answers are equally wrong. Instead, some answers are less correct and some are more correct. For example, in an image categorization system, if an image is shown of a nectarine, the identifying the image as a bicycle is less correct than identifying the image as a plum. Nectarines and plums more related than a bicycle and a nectarine. Similarly, categories of numbers and/or ratings have greater relationships between adjacent categories than distant categories. For example, if a movie is rated on a scale of 1 to 5, with a "true" value of 4, then a miscategorization of 3 or 5 is less incorrect than a miscategorization of 1 or 2 which are further from the true value. Similarly, consider a system that attempts to estimate an age of a person from an image. If the person is actually 50, an answer of 46 is more accurate than an answer of 20.

Categories may also be more or less correct based on their specificity. For example, if an image shows a raven, identifying the image as a crow is incorrect. However, identifying the image as a bird is both correct and less correct than identifying the image as a raven. Children and/or non-experts may name items by the category name for the objects because they haven't learned the specific names of the particular object being considered. This is also a technique used by persons in a secondary language where they have a limited vocabulary, where the technique is known as circumlocution. For some cases, the category name is sufficient identification. For example, reference to "the hammer" may be sufficient when there is one hammer in a set of tools. In such a case, where there is just one hammer, an identification of "the claw hammer with the yellow grip" may be unhelpful and in some cases wasteful. The excess information may not be relevant to the task at hand and may take additional time or effort to process. Thus, once something has been uniquely identified based on context, additional subcategorization may be less useful.

When performing category recognition, machine learning systems may have a set of categories. The machine learning system outputs a vector with a value for the result of the comparison of the input against the category associated with the index value of the vector. For example, if there is a match, the system may assign a value of 1 to a space in an answer vector corresponding to the category. In this instance, the value of 1 is used to indicate match. If there is not a match, the system may assign a value of 0 to the space in the answer vector corresponding to the category. In this instance, the value of 0 is used to indicate non-match. The values of 1 and 0 are used as placeholders, with any value being suitable for match and any different value being used for non-match. For example, match may be represented by a first value and non-match by a second, different value. The values of 0 and 1 are often used in computer science and logic due to their compactness (being able to be represented in a single binary bit). While in such schemes 1 is generally used to represent TRUE or match and 0 is used to represent FALSE or non-match, other associations between actual values and information may be represented without departing from the scope of this disclosure. For example, the values of TRUE and/or FALSE may be switched and/or replaced with other values. The system may use floating point values, negative numbers, and/or other values to represent the TRUE, FALSE, and/or intermediate values. One can even conceive of using text strings to represent the values, for example. The information may be encoded in any reasonable format without departing from the scope of this disclosure. The use of 0 for FALSE and 1 for TRUE with intermediate values representing categories associated with the TRUE category is favored due to its consistency with defaults in computers science. However, this binary compatible approach is not needed to implement the subject matter of this specification.

For example, consider a system where the answer vector represents cardinal directions (North, East, South West) with ranges from 0 (unrelated) to 1 (the named direction). This construct does not prevent partial positive values in opposite directions, so a machine learning system could output an answer containing non-zero values in both North and South. In contrast, the outputs could also be organized as two values ranging from 1 to −1 so that the category vector instead represents (North-South, East-West). Thus, an answer vector of (1, 0) would represent North, while an answer vector of (−1, 0 represents South, both answers without an East-West component. This approach may provide benefits in constraining the scope of potential answers of the machine learning system.

Some machine learning systems may output a probability array in their answer vector, where each value in the vector corresponds to a probability of matching the associated category. In some instances, such an answer vector is normalized prior to comparing against a "true" value in a learning set. The normalization may include setting the largest percentage to 1 and the remaining values to 0. The answer vector may be subject to secondary processing to produce the answer. In many cases, the answer is the category associated with the largest probability (or greatest magnitude) in the answer vector. However, as discussed below, this may be modified when the vector includes overlapping categories. In instances, where a parent category has the greatest probability in the answer vector, it may be useful to determine is a subcategory of the parent category is matched above a threshold. If the subcategory match is above the threshold identification of the subcategory may be selected as the answer as the subcategory provides more information. For instance, an image of a golden retriever is both an image of a dog and an image of a golden retriever. However, an answer of golden retriever provides more information over the answer of dog because golden retriever includes the properties of the parent category (dogs). In some instances, the answer may include both the parent category and subcategory, e.g., "dog: golden retriever."

The "true" value provided with a learning set case may be a control vector having a single value of 1 (match) and the remaining values as 0 (non-match). The machine learning system may measure a difference between the answer vector and the control vector. This difference between the two vectors may be used to provide feedback to the machine learning system about the quality of the answer vector. The machine learning system may be use a minimization, maximization, or other type of approach depending on parameters selected for the machine learning system. For example, a minimization may be represented as a sum of the absolute value of difference of each value between the answer and the true value. This minimization may be the sum of the square of the differences between the answer vector and the answer vector. Other minimization functions may be readily substituted. In other approaches, the system may be designed to maximize the difference between a control vector and the answer vector. An Argmax approach may be applied as readily as an Argmin approach. Similarly, other comparisons for providing feedback to the machine learning system may be used without departing from the scope of this disclosure.

Consider a category vector having (apple, peach, plum, nectarine, bicycle, tree) as the first six categories. For a learning set image of a plum, the control vector may be (0, 0, 1, 0, 0, 0). Thus, an answer of plum is correct and all the other answers are incorrect. Notably, all the other answers are equally incorrect. Thus, when shown an image of a plum, if the system answers (identifies the image as) peach the system is docked the same number of points as if the system had identified the plum as a bicycle. This approach may maximize the system producing the correct answer. However, a cost of this approach is that incorrect answers are not biased towards those most like the correct answer. This is because there is no biasing in the weighting of the related categories in the control vector used to train the machine learning system.

Now, consider the use of a training set control vector which considers the relationships between the categories. Such a control vector may be (0.1—an apple is a fruit, 0.3—a peach is a fruit and similarly shaped, 1.0—a plum is still a plum, 0.5 a nectarine is fruit, similarly, shaped, and has a similar smooth skin, 0—a bicycle has no natural relationship to a plum, 0.01—a tree has very little relationship to a plum). Using this control vector produces a different outcome than the previous control vector. Incorrect categorizations are weighted more heavily (i.e., are non-zero, or different from the non-match value) in this control vector. This will increase the probability of incorrect answers. However, not all incorrect answers are weighted the same. For example, Peach and Nectarine are weighted more heavily than Tree and Bicycle in order to bias the machine learning system's answer vector. As a result, the system is more likely to provide the incorrect answer of Peach over the incorrect answer of Bicycle. Further, depending on the purpose of the determination, an answer of Peach may be an acceptable answer. For example, if the question asked is, 'Which of these images shows a stone fruit?' then misidentifying the image of a plum as a peach does not produce the same error as misidentifying the image of the plum as a bicycle. Similarly, a question of "Is the item in the image edible to humans?" may be tolerant to some types of misidentification. When the relationship between the categories is relevant to the question being considered, the closer incorrect answer may be an equally correct output answer. For numerical categories, for example, the differences between categories may not be meaningful or may be small compared to the within category variance. For example, estimating someone is 20 vs. 21 is meaningful for determining the ability to legally purchase alcohol but is likely not meaningful when determining whether to offer them the retiree lunch special. Numerical categories may also be provided with parent categories as descried above, so the system may categorize ages into parent categories of 25-30, 31-35, 36-40, etc. while having subcategories by age below. This approach allows "estimation" of the result while allowing identification of the subcategory e.g., (26, 27, 28, 29, 30) when the accuracy of the machine identification supports determining the narrower category.

It is useful to recognize that identification of a larger or parent category of the object being characterized may be sufficient to answer the question asked. Suppose an expert system is asked to review surveillance footage and identify what happened to some berries on berry bushes. An answer of birds ate them may be sufficient without identifying the genius and species of birds involved. This is similar to how humans categorize objects. For example, with an image, a person may identify the image as a Red Bird but not know enough to determine the image is a cardinal. For some uses, the identification of Red Bird may be sufficient to answer the question.

Above, the use of similarities between categories was discussed with respect to increasing the quality of incorrect categorizations produced by a machine learning system. However, the described approach may also be used to increase the confidence of correct categorization. With related categorization, the correct answer is not a vector with all zeros and a single one. Instead, the correct answer should reflect the degree of overlap between the categories. Put another way, a picture of a plum should be partially ranked as a nectarine or peach because there are similarities in images between those. Thus, a system output an answer vector should include probabilities of these associated categories based on the similarity as assess by the input data.

In this sense, the answer vector is a distribution of relationships values between the various categories, from 1 (match) to 0 (unrelated).

Consider an image of a bird to be processed. There are a number of bird shapes with various degrees of similarity. However, the image also shows an unusual correlation with an image of a red apple. This color information from the correlation may provide secondary verification that the bird is a cardinal (or at least a bright red bird). Further, an answer of "cardinal" which doesn't have a strong element of "bird" may be incorrect or at least warrant additional consideration. Similarly, other categories of related birds having similar size, shape, etc., should have similarity represented by non-zero values in the answer vector. The absence of such overlap again is a secondary indication that the primary identification may be incorrect.

Categories may be presented that are features and/or traits of the objects being categorized. For example, color and/or combinations of colors may provide an effective way to help distinguish images of animals. A big bear that is white is a polar bear, while one that is brown may be a brown bear or black bear. Regardless, there is similarly between the categories of polar, brown, and black bear but the correlation of secondary categories may help confirm the determination as well as reduce incorrect matches. In this sense an answer vector of a number of categories is similar to a "fingerprint" or chemical spectra, except instead of indicating, for example, bond energy absorption, it shows similarity of the identified category to other categories in the answer vector. Another use of such values is these non-zero, non-one values in the answer vector is that they can be used to create better control vectors. For example, it may be difficult to determine what the percentage correlation in images between different related categories should be. However, providing estimates and then modifying them based the answer vectors of the trained machine learning system may allow the control vectors to approach a true measure of correlation of the inputs as assessed by that machine learning system.

Similarly, the presence of a broader shoulder and/or asymmetry in the correlation values may indicate the higher likelihood of one value versus another. Consider a category vector for ages (0 years, 1 year, 2 years, etc.). If the answer vector is equal at 34 and 35 but drops sharply at 36 and is near zero by 37, while having a broad shoulder towards lower values before terminating near 28, this may function as a tie breaker between 34 and 35.

Among other examples, this specification describes a method of training a machine learning system, the method including: training the machine learning system in category identification against a test case wherein the machine learning system outputs an answer vector and the answer vector is compared against a control vector where the control vector includes three different values, the values including: a first value for a matching category for the test case; a second value for a non-matching category for the test case; and a third value for a first category related to the matching category for the test case wherein the third value differs from the first value and the third value differs from the second value.

Among other examples, this specification also describes a category identification training system, including: a processor and a memory communicatively coupled to the processor, the memory containing instructions which when executed cause the processor to: train a machine learning system in category identification, wherein the machine learning system outputs an answer vector and values in the answer vector correspond to categories, wherein the categories include a first category and a first subcategory in the first category and wherein the value in the answer vector corresponding to the subcategory determines whether the machine learning system identifies an output as the first sub category and does not identify the output as the first category.

This specification also describes a category identification system comprising: a machine learning system comprising a processor and an associated memory; wherein the machine learning system is trained against an answer vector, wherein positions in the answer vector correspond to different cardinal directions and such that the values of the answer vector may be combined to generate an orientation.

Turning now to the figures, FIG. 1 shows a method (100) of training a machine learning system according to an example consistent with this specification. The method (100) includes: training the machine learning system in category identification against a test case wherein the machine learning system outputs an answer vector and the answer vector is compared against a control vector where the control vector includes three different values, the values including: a first value for a matching category for the test case; a second value for a non-matching category for the test case; and a third value for a first category related to the matching category for the test case wherein the third value differs from the first value and the third value differs from the second value The method (100) is a method of training a machine learning system. The output of the machine learning system is an answer vector containing a set of values for various categories. The answer vector is compared against a control vector provided as part of the test case. The control vector includes a first value for the matching category. The control vector includes a second value of the non-matching category. The control vector includes a third value for a category which is not the matching category but is related to the matching category. The inclusion of the third value allows the machine learning system to differentiate between near misses and unrelated categories.

The machine learning system is a system for categorization of information into categories. A variety of machine learning systems exist, each with their own benefits and drawbacks. Examples include Bayesian networks, clustering algorithms, support vector machines, nearest neighbor machines, Q-learning, temporal difference (TD), deep adversarial networks, neural networks, decision trees, etc. The machine learning system is trained using a training set. The training set includes a set of cases, each case including an input and a control vector which indicates the correct answer for the input.

The input depends on the type of information that the machine learning system is being trained to process. For example, the input may be an image, a series of images such as a video, a three-dimensional model, a text, a document, an audio clip, a medical file, a review, an opinion, an evaluation, etc. The input may receive preprocessing to standardize the format of the input. A source of information may be divided into a plurality of inputs. For example, a medical history may be divided into different time frames to provide different levels of knowledge and to teach the progression of a disease to enhance early detection.

The machine learning system receives an input and produces an answer vector. The answer vector includes a series of values. Each value in the vector is associated with a category. The categories may be stored in a category vector. The categories may be stored in a database and/or another data structure. In some instances, the values of the vector are limited to a range of 0 to 1. For example, 0 may represent the non-matching of the input to the associated category while 1 represents a match between the input and the associated category. Values between 0 and 1 may also be included. For example, the values may represent a probability of match between the input and the associated category.

As an example, consider a category vector of (apple, bird, house). The machine learning system is provided an input of a red house. The machine learning system outputs an answer vector of (0.01, 0, 0.99) indicating a 1% chance the image is an apple, a 0% chance the image is a bird, and 99% chance the image is a house. Note that the sum of the probabilities adds up to 1 (or 100%). The system may output matches as values and then be normalized to 1. This may be done, for example, using a SoftMax algorithm. A variety of methods for normalization exist and the described invention does not require normalization and/or the use of any particular algorithm to perform normalization.

Now consider a category vector of (cat, dog, greyhound, banana). The second and third categories are strongly correlated. All greyhounds are dogs, but not all dogs are greyhounds. Further, cats and dogs share some common physical features, including legs, tails (in some cases), fur, teeth, etc. In contrast, a banana shares very few features with the other categories so as to be distinct and/or unrelated.

Now if an image of a greyhound is provided to the expert system, the ideal output would be something like (0, 1, 1, 0). If this was normalized, then the values would be normalized to (0, 0.5, 0.5, 0). In practice, because of similarities in appearance between dogs and cats, the system may output an answer vector which is (0.3, 1, 1, 0) which may be normalized to (0.13, 0.43, 0.43, 0) with the values truncated. The appropriate weighting of the first category will depend on how much the expert system views cats and dogs as similar categories. The more cats and dogs are similar, the greater weighting the category cat will receive. Similarly, while every greyhound is a dog, an image of a greyhound can look more like an image of a greyhound than an image of a generic and/or categorical dog. Accordingly, in some examples, the value of the third category may exceed the value of the first category because of a tighter match between the image and the system's identification of a greyhound vs. a dog. The system should to provide notable weighting to dog due to the relationship between the two categories (i.e. greyhound being a subset of dog).

Here the relationship between the two categories results in non-zero values for multiple categories. If the system is trained against a control vector of (0, 0, 1, 0) because the image is of a greyhound, the machine learning system is skewed and considers the image equally unrepresentative of dogs and bananas, which is incorrect. Instead, by using a control vector with at least three values, representing match, unrelated, and related, the quality of the training is increased. Thus, a control vector of (0.2, 0.4, 0.4, 0.0) trains the system that the image is a greyhound but is also a dog and has some similarities to cats but is unrelated to bananas. This categorical relationship information may reduce the instances of misses being unassociated with the image.

As discussed above, a category vector may store the categories associated with the answer vector and the control vector. The category vector may be stored as a vector. The category vector may be stored in a database and/or another data structure. The categories of the category vector may be the index of vector. For example, if the categories are whole numbers from 1 to 5, such as when representing ratings and/or similar material, the index may serve as the category identifiers. When the categories have a natural progression, the index may serve as a proxy for the category names. For example, consider the pain measurement scale used by clinicians which uses a series of faces showing various levels of discomfort to represent pain, the index may be used to map the categories to numbers and/or vice versa. Similarly, colors may be indexed by their spectra and/or other position. In such cases, ordering the categories such that adjacent categories have commonalities may provide a basis for creating the control vector using the index value. A set of categories that may be assigned to an order may benefit from ordering the categories such that the index implies information about the similarity of categories in near values to the index. For example, the Dewey decimal system assigns broad categories arbitrarily but related categories have similar numbers, allowing estimation of the similarity of the categories (subjects) based on the index (Dewey decimal number).

A category vector may map a tree and/or similar structure. For example, a category may contain a vector of subcategories. For example, consider a category of (dog) with an index of 1, sub categories may be indexed as an index value of the vector of subcategories, e.g., 1.1=(pug), 1.2=(golden retriever), 1.3=(Labrador retriever). When structured this way, the index values contain additional relationship data about the associated categories. For example, all the subcategories are contained in the associate category so an automated system can determine that pugs, golden retrievers, and Labrador retrievers are all dogs.

In some examples, the category vector is extracted from an existing hierarchical structure. A wide variety of fields include taxonomical methodologies to classified things, including geographic regions, celestial objects, animals, minerals, plants, flowers, fungi, etc. In some examples, these taxonomies may be automatically extracted and encoded in the category vector. The information from the taxonomy may then be used to generate the control vector for a category, where other categories in a group are given a first value, a second value for the parent category, a third value for any subcategories of the category, etc. While it may be useful to limit the number of tiers of categories, this structure also allows flexibility to adjust categories as new categories and/or relationships are identified.

A test case is an example used to train a machine learning system. A test case includes an input provided to the machine learning system. A test case includes information to determine the control vector. That information may be the index value of the control, answer, and/or category vectors. In some examples, the control vector is provided, updated, and/or reviewed by a human based on the relationships between the categories. In an example, the control vector is calculated by a processor using the index value. The index value may be determined from the answer provided in the test case by comparing the answer with the category vector.

The control vector is a vector containing a series of values, one for each category with a value in the answer vector. The control vector may be thought of as the true value of the test case. The machine learning system adjusted and/or self-adjusts to minimize the differences between the answer vectors and the associated control vectors over the training set. If the training set is representative, this minimization should minimize the error when the machine learning system is applied to inputs outside the training set. Indeed, if the training set was complete, then a lookup system could be used with the training set to provide the "correct answer" each time. However, such a training set would be unreasonably large and would consume an unreasonable amount of work to define the correct answers for all instances. So instead, training sets are used to train the machine learning system, recognizing that there is a tradeoff between size of the training set and accuracy.

The values in the control vector include a first value indicating a match between the associated category and the input provided to the machine learning system. The value may be 1. The value may be the largest value in the control vector.

The values in the control vector include a second value. The second value indicates a non-match and lack of relation between the associated category and the input material in the test case provided to the machine learning system. This value may be 0.

The values in the control vector include a third value, indicating the associated category is related to the matching category. The categories associated with the first and third values may have a parent/child relationship, the categories may both be part of a larger group, the categories may share attributes, properties, etc. The third value may be between the first value and the second value. The value of the third value relative to the first value and second value may indicate a degree of relationship between the true category and the related category associated with the third value.

The control vector may be a particular instance of the following function:

$$\sigma_i^j = \frac{e^{-\phi(i,j)}}{\sum_{k=1}^{K} e^{-\phi(i,k)}} \quad (1)$$

where phi(i,j) is a cost function selected from any suitable cost function which penalizes how far class i is from class j. Intuitively, this formulation resembles that of a softmax layer. However, penalties are encoded in normalized probability distribution. In this form, the element corresponding to the original class will have a higher value while nearby elements will decay their values as the index moves away from the true class. Hence, this encoding naturally adapts the relationship information in the category vector without explicitly encoding, for example, the ordinal classes.

Figure 2:
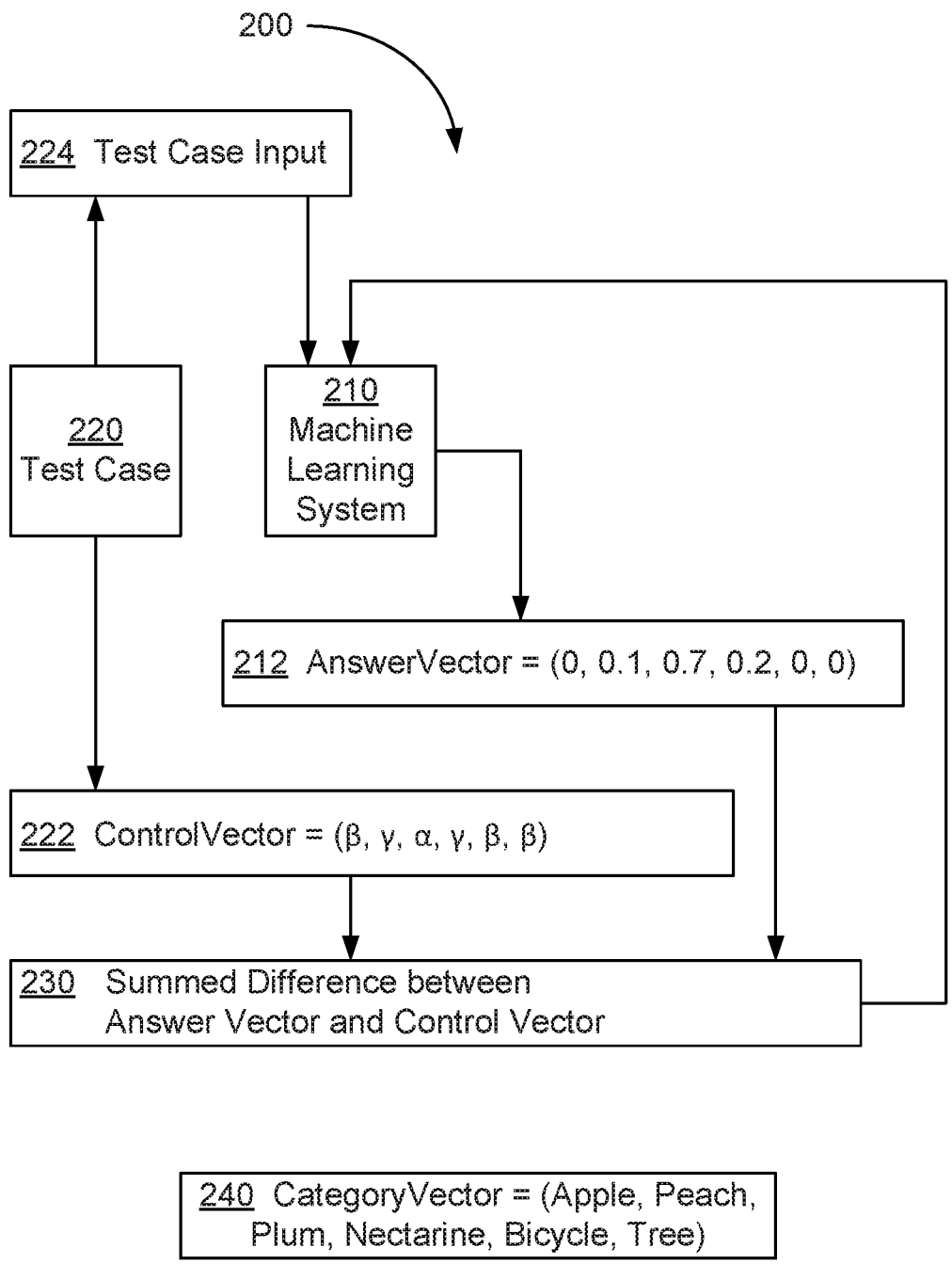
FIG. 2 shows a system for training a machine learning system according to an example consistent with this specification.

FIG. 2 shows a system (200) for training a machine learning system (210) according to an example consistent with this specification. The machine learning system (210) receives a test case input (224) which the machine learning system (210) uses to generate an answer vector (212). The test case (220) provides the test case input (224) for the machine learning system (210). The test case (220) also provides a control vector (222) including a first, second, and third values (shown as alpha, beta, and gamma in FIG. 2). The control vector (222) and answer vector (212) are compared and the summed difference (230) between the answer vector (212) and the control vector (222) is calculated and feed back to the machine learning system (210). A category vector (240) containing the category identifiers for the positions in the control vector (222) and the answer vector (212) may be available. The information in the answer vector (212) and category vector (240) may be used to provide the output from the machine learning system, namely the category the machine learning system assigns to the test case (220) based on the test case input (224).

The system (200) is a system for training a machine learning system (210).

The machine learning system (210) includes a processor and an associated memory. The processor may also support other operations of the system (200). In some examples, the system (200) includes multiple processors which may support dedicated and/or varying tasks.

The answer vector (212) is an output from the machine learning system (210) based on the test case input (224). The answer vector (212) includes a value for each category of a plurality of categories. The categories may be stored in the category vector (240). The answer vector (212) may be subjected to post processing after the answer vector (212) is received from the machine learning system (210). In an example, the answer vector (212) is normalized to a length and/or sum of 1 after being received from the machine learning system (210).

The test case (220) includes the test case input (224) and information which may be used to generate the control vector. This information may include the index associated with the test case input (224). In an example, the test case (220) includes a picture of a housecat as a test case input (224) and the identification "cat." The system (200) may consult the category vector (240) to determine the index value associate with "cat." For example, the system (200) may parse the category vector (240) until the system (200) finds a category named "cat." The index associated with the category "cat" may be used to obtain the control vector (222). In an example, the control vector (222) is calculated based on the index. The control vector (222) may be calculated based on the index and the structure of the category index (240). In an example, the control vector (222) is obtained from a lookup table.

The test case input (224) is the information provided to the machine learning system (210) to produce the answer vector (212). The machine learning system (210) determines the answer vector (212) based on the test case input (224) and the properties of the machine learning system (210) which have been developed using the training set of test cases (220). After the machine learning system (210) is adequately trained, the provision of an input, including an input besides those inputs from the test cases (220) used in training will produce an answer vector (212) identifying a category associated with the input. So eventually an image of cat may be provided as an input to the machine learning system (210) causing the machine learning system (210) to return an answer vector (212) where the answer vector (212) indicates an answer value having an index, the index may then be applied to the category vector to extract the category identifier "cat."

The control vector (222) is the "true answer" for the test case (220). The control vector (222) indicates that values that the answer vector (212) should obtain after perfect optimization. In practice, there will always be some differences between the control vector (222) and the answer vector (212). These differences come from a variety of sources and include factors such as: limitations in the training set, incorrect assignments of relationship value to the control vector, either by a calculation and/or by a person, non-representativeness of the test case input (224) to the associated category. For example, consider a training set which includes 100 images of dogs, the machine-learning system's "ideal dog" may be thought of as a composite of the test case inputs (224) of the test cases (220) of the training set. That composite defines the category of "dog" for the machine learning system (210), and the parameters have some flexibility to cover a variety of image of dogs, including images not used in the training set. However, it is unlikely that any particular image of a dog looks like the composite, instead, different images vary in different ways: some have larger dogs, some smaller dogs, different colors, different proportions, different textures, etc. Accordingly, no individual test case (220) is likely to perfectly match the composite which is associated with the answer vector (212).

While this discussion revolves around the "dog" category, the answer vector (212) may include non-zero (or non-unassociated) values for a variety of categories. For example, a there may be a mild relationship between images of cats and images of dogs, a stronger relationship between images of wolves and images of dogs, an intermediate relationship between images of foxes and images of dogs, no relationship between images of whales and images dogs, etc. The control vector (222) includes third values (e.g. intermediate values, γ) for categories related to the correct category. These weighting for the third values may be manually determined and/or assigned based on intuition and/or calculation. These weightings may also be iteratively determined using the training set. For example, the weightings may be initially generated using a formula or based on professional estimate. After the system has been trained, then the weightings in the control vector (222) may be updated to reflect the values in the answer vector (212) produced by the machine learning system (210). Additional training may then be conducted and the weightings in the control vector (222) updated again. This iterative approach recognizes that the relationships between the different categories may not be easily estimated. For example, human assessment of similarity may be different from the assessment by the machine learning system (210). With an interactive approach the control vector (222) is updated to reflect the learned values of the answer vector (212) after the machine learning system (210) is trained. In some examples, these values may be updated as the machine learning system (210) is used. This may be especially useful if user feedback can correct erroneous categorizations to avoid repeated errors.

The summed difference (230) between the answer vector (212) and the control vector (222) is provided as feedback to the machine learning system (210) to evaluate how well the machine learning system (210) did in assessing the test case input (224). The summed difference (230) may be calculated in a variety of ways. In an example, the summed difference (230) is the square root of the sum of the squares of the differences of each value in the two vectors. The summed difference (230) may be first order and sum average the absolute values of the differences of each value in the two vectors. Different methods of calculating the summed difference (230), for example, using different powers, e.g., square vs. linear, may produce different distributions between the impact of the main category and the associated categories, even when the third values are held constant. Similarly, the ratios between the different values of the control vector may be used to adjust the outcome. Some examples of other techniques which may be used to determine the difference between the answer vector (212) and the control vector (222) include but are not limited to: cross-entropy, Kullback-Leibler divergence, Jensen-Shannon divergence, Bregman divergence (using the mean vector), sum least squares, sum linear difference, minimum distance estimation, etc. The described approach does not depend on the use of any particular method or technique to compare the answer vector (212) and control (222) vector to provide feedback to the machine learning system (210).

The category vector (240) provides the ability to coordinate the activities of the machine learning system (210) to the categories understandable to a user. The category information is represented by the index value in the answer vector (212) and the control vector. The machine learning system (210) optimizes the test case inputs (224) to produce an answer vector (212) with a minimum summed difference (230) from the control vector (222). None of those operations use the category identifier stored in a category vector (240). Put another way, if a machine-learning system was instructed that images of cats were "unicorns" the machine learning system (210) would learn to identify them as unicorns, not cats. Similarly, the system (210) treats ordinal category identifiers as unrelated to each other unless effort is made to include that relationship information in the control vector (222). While the category identifiers may be stored in a category vector (240), other methods of storing and retrieving category identifiers may be used, including data structures and databases.

This language independence of the categorization and processing is useful when dealing with multiple human languages. Namely, for ideas/concepts which are the same and/or strongly similar in different languages the language specific name may be provided from a language specific category vector (240) without retraining the entire machine-learning system (210). This tends to work better with discreet objects, such as those being identified in pattern recognition of images. In an example, the category vector (240) is a two-dimensional array of category vectors (240) containing the category names in different human languages. Some category identifications, like numerical values are especially amenable to transfer between different languages with little specificity loss. Similarly, more specific categories of physical objects are easier to move between languages than more abstract and/or philosophical concepts.

Figure 3:
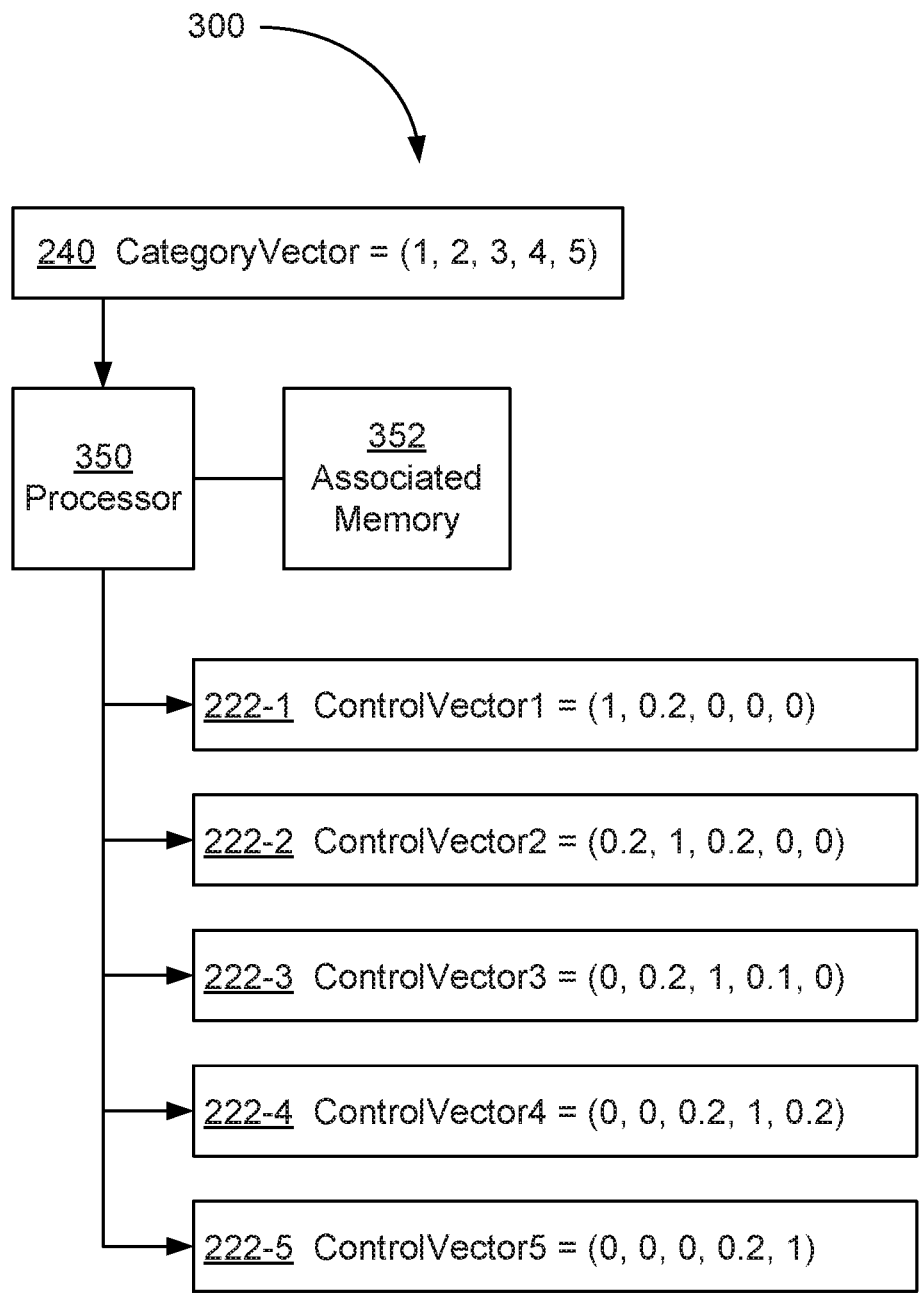
FIG. 3 shows an example of a system for converting a set of numerical category identifiers into a set of control vectors according to an example consistent with this specification.

FIG. 3 shows an example of a system (300) for converting a set of numerical category identifiers in a category vector (240) into a set of control vectors (222-1 to -5) according to an example consistent with this specification. In this system, a processor (350) having an associated memory (352) identifies the categories in the category vector (240) as sequential whole numbers. While the whole numbers start at 1 in the example, they may start and end at any value. The category identifiers may be whole numbers or fractions, real number, etc. The increments between adjacent categories may be uniform and/or may vary. For example, the category vector (240) may include values of 1, 2, 4, 8, 16, etc. A category vector may (240) may be (0.1, 0.4. 0.7, 0.8, 0.9, 0.99, 0.999, 1). categories are organized so that based on similarity, the category values are ordered.

For numbers, this may be thought of as any category value with an index X has a categoryvector(x)>categoryvector(x−1) and categoryvector(x)<categoryvector(x+1). Where the categoryvector is the vector of category names. For non-numerical categories determining the order and the values of relationship between categories is more difficult. For example, is a lemon more like an orange or a grapefruit? For a parent category of citrus fruits, perhaps a categoryvector such as (lemon, line, orange, grapefruit) may be correct but (lime, lemon, grapefruit, orange) may be equally correct. Further, one may be correct for measurements of acidity while a different vector order may be correct for images, where color of the skin of the fruit is a greater factor.

The use of an automated method to provide the non-zero, non-1 values of the control vector reduces a labor-intensive portion of the using the relationships between categories to increase the accuracy of the categorization of machine learning systems (210). In this approach the control vector assigns the first value to the category of the control vector, i.e., if the answer for the given input is 3, the value in the vector associated with the category 3 is set to 1. Next the adjacent categories are set to a third value. Adjacent categories are identified by adjusting the index up 1 and down 1. The remaining categories are assigned the second value for unrelated categories.

Additional rules may be provided for example, categories two away from the category may be assigned a non-zero correlation as well. If the category vector (240) is non-linear and/or has unequal spacing between adjacent categories, the equation to define the control vector (222) may be adjusted to reflect that information.

Consider a machine learning system (210) designed to detect underage drinking. the category values may be a person's age. The input to the machine learning system (210) may be an image. Thus, the category vector (240) may run from (18, 19, 20, 21, 22, 23, etc.). However, because of the importance of the age of 21 on alcohol consumption in the U.S., the system may provide lower value for answers on the opposite side of the 21-year-old age line to reduce misidentification across that legal limit. Consequently, a control vector for a 21-year-old may be, for example, (0, 0, 0, 1, 0.3, 0.2). Similar structures may be arranged for other control vectors for different ages. Misidentifying a 20-year-old as 18 may have minimal consequences for alcohol regulation while misidentifying a 20-year-old as 21 may have greater consequences. The ability to provide asymmetrical bias in the answers allows the system to reduce the rates of unacceptable errors.

In some examples, the relationship information between the categories is extracted from another source. Above categories associated with number were considered as an example but anything that can be put on a linear scale can take use of the adjacency approaches discussed.

For two dimensional organized categories, the organization is harder. For example, consider geographic information, an organization of cities by east-west or north-south may not be as useful as separations (again depending on the purpose of the categorization by the machine learning system (210)). Accordingly, when there are multiple axes, it may be useful to perform calculations based on additional information about the various categories. For example, the system may determine the "relevance" of other cities based on geographic separation, population, education levels, type of industry, open space, housing prices, and/or any number of other factors. The factors should relate to the question being asked. For example, using pollen measurements in adjacent areas may allow estimation of pollen levels in an area without a sensor. Using similarly priced metro areas may be relevant when considering housing valuation.

The use of multiple dimensions to define the categories is more challenging than using a single dimensional array of categories. One intermediate source of structure between linear arrays of categories and multiple dimensional assessments are trees. Trees may be used to map related items and provide for subcategories and supercategories. Further, may trees and/or taxonomies of different items are already available in databases and sources where the structure can be extracted using an automated and/or semiautomated process. Natural science information is widely available in such structures, for example, Carl Linnaeus' system of biological classification. In an example, items in a shared group are assigned a third value, for example, species in a genius. The genius could also be assigned a third value (or the first value). Species further out may be assigned predetermined values based on their distance on the tree from the test case category.

Figure 4:
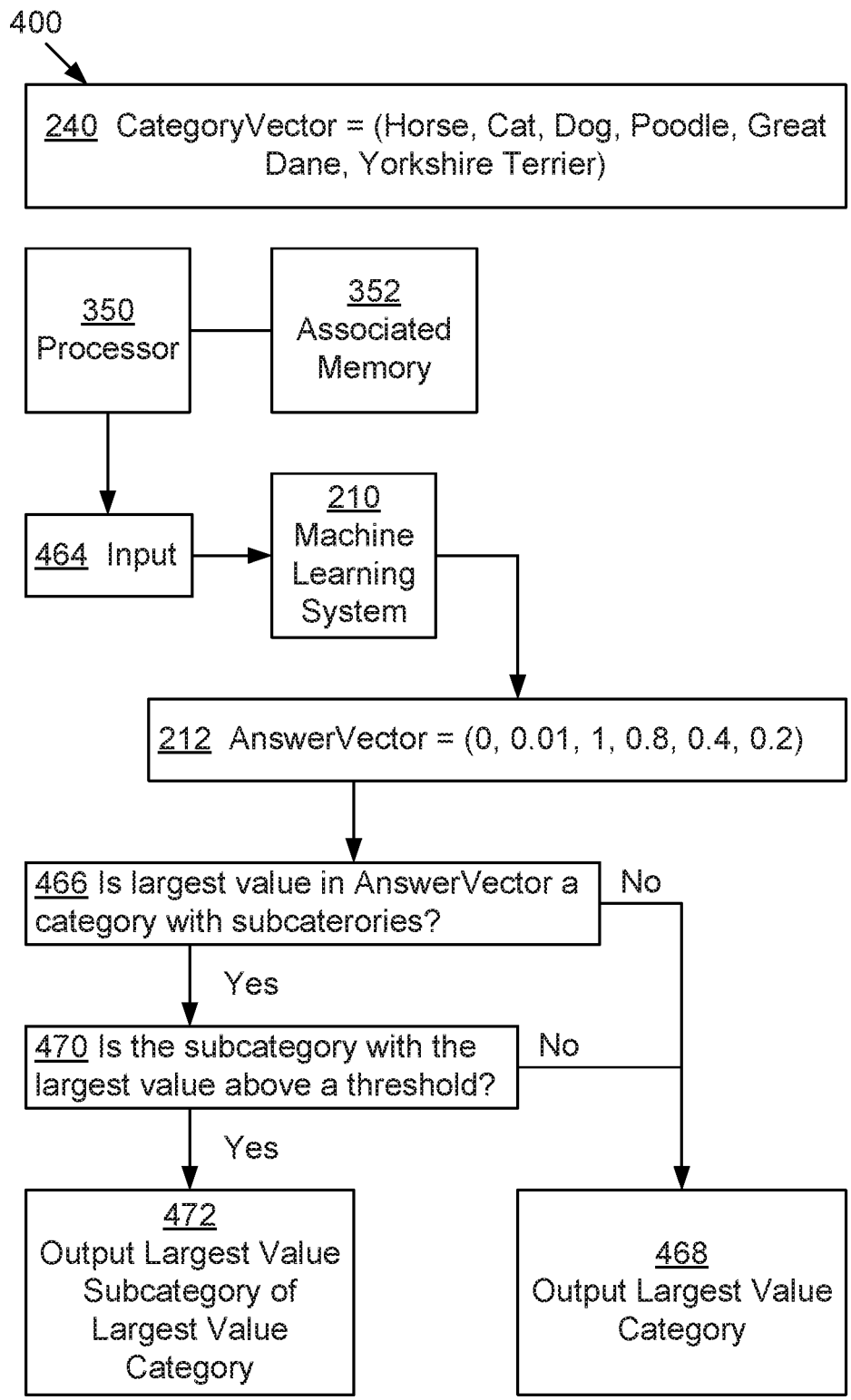
FIG. 4 shows a category identification training system consistent with the present specification.

FIG. 4 shows a category identification training system (400) consistent with the present specification. The system (400) comprising: a processor (350) and a memory (352) communicatively coupled to the processor, the memory (352) containing instructions which when executed cause the processor to: train a machine learning system (210) in category identification, wherein the machine learning system (210) outputs an answer vector (212) and values in the answer vector (212) correspond to categories, wherein the categories include a first category and a first subcategory in the first category and wherein the value in the answer vector (212) corresponding to the subcategory determines whether the machine learning system (210) identifies an output as the first subcategory and does not identify the output as the first category.

In the example shown in FIG. 4, the category vector (240) includes Dog, Poodle, Great Dane, and Yorkshire Terrier as categories. Thus, the category vector (240) includes a category as well as sub categories of the category. Consider an image of a poodle provided to a machine learning system (210) trained on a training set for these categories. A poodle is a type of dog. Accordingly, a system could output either dog or poodle and produce a true answer. The described approach provides the "narrowest reliable answer." Consequently, if poodle is above a threshold, the system reports poodle, even is dog is the highest rated category.

The approach begins with the answer vector (212) provided by the machine learning system (210). The answer vector (212) in FIG. 4 has not been normalized. However, a similar approach may be taken with normalized answer vectors (212).

The system (400) identifies the largest value in the answer vector (212). In systems without overlapping categories, this largest value would proceed to be the answer provided by the system (400). The system (400) then determines if the category with the largest value has any subcategories (466). If there are no subcategories, there is no need to determine if the input more properly describes a subcategory and the system (400) outputs the category with the largest value in the answer vector (212) at (468).

If the category has subcategories, then system (400) identifies the subcategory with the largest value. That subcategory is then compared against a threshold. The threshold may be an absolute value. The threshold may be a value relative to the largest value in the answer vector (212). For example, if the answervector(subcategoryindex)/answervector(parentcategoryindex)>70% (threshold), then the subcategory may be reported as the answer (472). The use of a ratio as the threshold allows may work independent of the normalization as it provides the same value for unnormalized and normalized answer vectors (212). If the value of the subcategory is above the threshold, the system outputs the subcategory as the answer (472). If the value of the subcategory is below the threshold, the system outputs the category as the answer (468).

This same approach can be applied to subcategories of the subcategory and so forth. Accordingly, the system (400) provides the narrowest identification above the threshold, allowing sets of categories and subcategories to be evaluated simultaneously in machine learning system (210).

FIG. 5 shows an example of mapping preexisting category information into the category vector (240) and control vector (222) according to an example consistent with this specification. FIG. 5 shows a category vector (240) for animals of the Candiae group on the left. On the right is a control vector (222) based on the relationships of the various breeds, species, geniuses, and the family which may be produced using an automated system. Because such taxonomies are already available, the ability to leverage the relationship information between different types of animals, rocks, plants, celestial bodies, etc. provides a way to incorporate relationship information between categories without using human entry and judgement calls for the values. Such taxonomies are also useful for automation providing at least an initial assessment of relationships without requiring human intervention.

Figure 6:
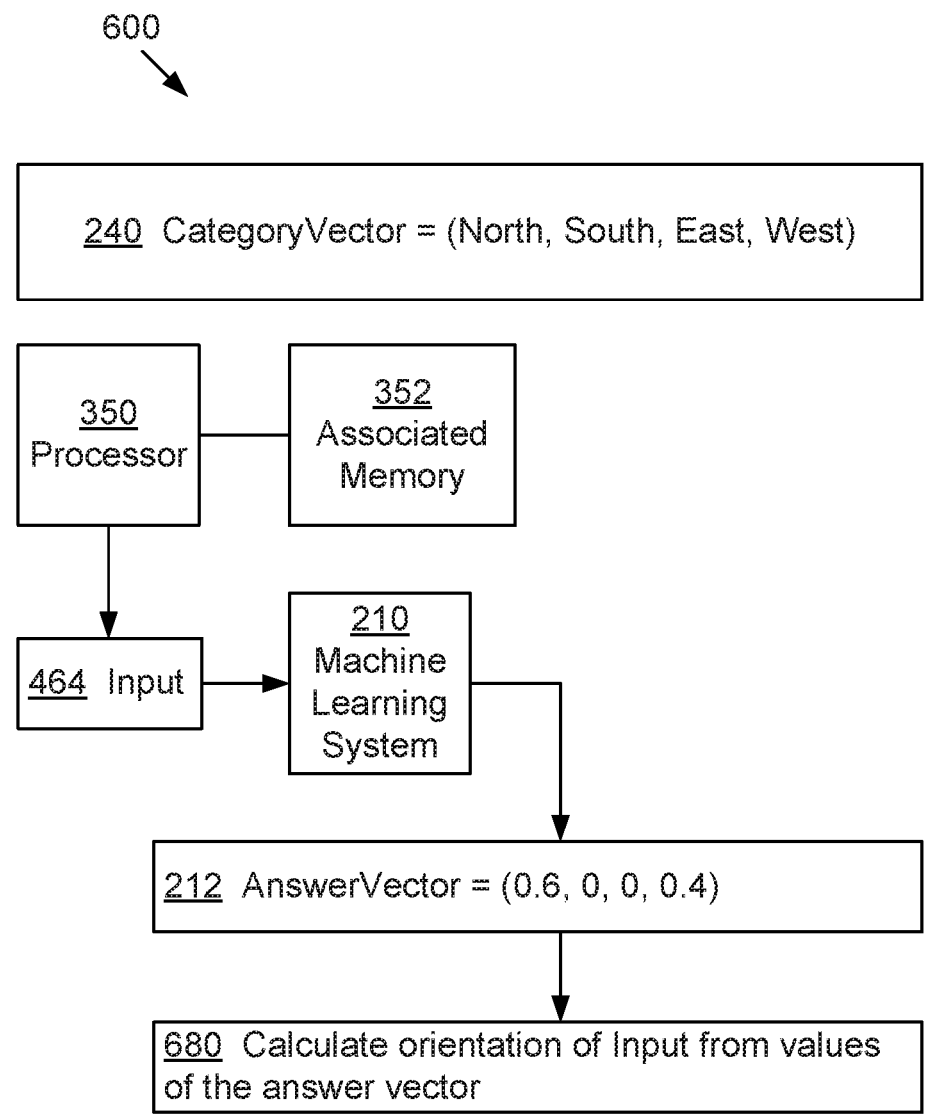
FIG. 6 shows a category identification system including a machine learning system trained to determine orientation from images according to an example consistent with the present specification Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

FIG. 6 shows a category identification system including: a machine learning system (210) including a processor (350) and an associated memory (352); wherein the machine learning system (210) is trained against an control vector (222), wherein positions in the control vector (222) correspond to different cardinal directions and such that the values of an answer vector (212) produced by the machine learning system (210) may be combined to generate an orientation.

As discussed above, the values of the various categories may be used as a secondary verification of the category determination by a machine learning system (210). However, the information in the non-greatest value may also be used to perform characterization of the input. FIG. 6 describes a particular approach to use such information to extract orientation from inputs (464), such as images.

Take a machine learning system (210). Train the machine learning system (210) against a type of input (464) such as an image with orientation information encoded in the control vector (222). Accordingly, the machine learning system (210) is trained not to identify the subject of the image but rather what direction the image is facing. The initial training set may include image facing north, south, east, and west, with the control vector (222) having just 1s and 0s (or first number and second number identify matching orientations and non-matching orientations). The control vector (222) may alternately be two values (one north/south and one east west). In one example, the values run from +1 to 0 to −1. The values may be adapted to another scale, e.g., 0 to 1.

The machine learning system (210) may then be provided with a test image having an orientation between two cardinal directions, for example, North-West. The system (210) will output values in both the north and west positions in the answer vector (212). The two values may then be used to reconstruct the orientation on the provided image based on the relative weightings of the components of the answer vector (212).

While this example describes extracting orientation information from images, the described approach may be used with a variety of different types of pattern recognition and categorization solutions. Similarly, the benefit of training systems with control vectors (222) including three types of values representing: category-match, category-unrelated, and category-related provide many benefits over the binary match/not match approach.

Another example of using the described approach is categorizing distances based on an image. In this example, the input to the machine learning system (210) may be an image. For selected (and in some cases all) pixels in the image, the machine learning system (210) determines a distance to the pixel. The distances may be in a linear scale set of categories, e.g., 2 meters, 4 meters, 6 meters, 8 meters, 10 meters, etc. The distances may be in an exponential scale set of categories, e.g., 1 meter, 2 meters, 4 meters, 8 meters, 16 meters, etc. The correct answer for each assessed pixel may be provided with the test case (220). This provided answer may be used to generate a control vector (222) for each pixel. The control vector (222) includes a first value for the provided or "correct" answer with decreasing but non-zero values for adjacent categories until the categories are far enough from the desired answer to reach zero (or the value representing non-match).

In an example, the control vector (222) is a product of the first value and vector of calculated decay factors. For example, if a pixel was at 5 meters, and the system was using the linear set of categories with 2 meter separations described above, the vector of calculated decay values might start with the values ($e^{-3}$, $e^{-1}$, $e^{-1}$, $e^{-3}$, $e^{-5}$). Each value is e raised to the negative power of the absolute value of the different between the value and the "correct" value. This distribution indicates that both 4 and 6 meters are equally acceptable answers (as both are 1 meter from the "true" value of 5) with 2 and 8 meters being favored over further distances. In some examples, when the decay value drops below a threshold, e.g. 10%, 5%, and/or 1% is may be rounded to zero to reduce the computational complexity.

Similarly, if the non-linear set of categories (the powers of 2 spacing) was used, the control vector (222) for pixel at 5 meters might be ($e^{-4}$, $e^{-3}$, $e^{-1}$, $e^{-3}$, $e^{-11}$). This distribution indicates that the category of 4 meters is considered the most correct answer (as 4 meters is 1 meter from the control or "true" answer provided with the test case (220). The categories of 2 and 8 meters being the next most correct answers as each is off by 3 meters from the test case (220) value of 5. Finally, the category of 1 meter is slightly favored over the furthest separation from the true answer, which is the category of 16 meters. Again, the powers are based on the absolute value of the difference between the value provided with the test case (220) and the class/category identifiers. This is a simple example of a way to use an equation and/or other calculation to produce the control vector (222) based on the category identifiers and the test case (220) value. Other such formulas, for example, with linear decreases, second order decreases, and/or other decay formulations may similarly be used to facilitate calculation of the control vector (222).

As described above, the phi equation for this example is $e^{(-1*(abs(i-j)))}$ where abs is the absolute value, i is the control value for the point provided with the test case (220), and j is the value in the category name. As discussed above, the phi equation may be rounded to zero below a threshold. Values produced by the phi equation may be normalized in a subsequent operation. As discussed above, the providing of decaying values away from the "true" value reduces penalties to near miss but wrong answers. This in turn favors the provision of a near miss over a far miss by the machine learning system (210). The result is that a wrong answer is more likely to be from a related category and in some instances the answer of related category will be sufficiently correct for the intended use of the answer. Estimates of distances are a good example, as missing by one or two categories may not impact the practical usefulness which is to say the correctness of the answer. For example, is the answer is 50, answers by the machine learning system (210) of 46 and/or 52 may be equally useful as estimates of distance.

It will be appreciated that, within the principles described by this specification, a vast number of variations exist. It should also be appreciated that the examples described are only examples, and are not intended to limit the scope, applicability, or construction of the claims in any way.

What is claimed is:

1. A method of training a machine learning system, the method comprising:
   training the machine learning system in category identification against a test case wherein the machine learning system outputs an answer vector and the answer vector is compared against a control vector where the control vector comprises three different values, the values comprising:
a first value for a matching category for the test case;
a second value for a non-matching category for the test case; and
a third value for a first category related to the matching category for the test case wherein the third value differs from the first value and the third value differs from the second value.

2. The method of claim 1, wherein the categories of the category identification comprise a series of numbers.

3. The method of claim 2, wherein the categories of the category identification comprise a set of integers which include all integers between a smallest integer in the set and a largest integer in the set.

4. The method of claim 1, wherein the test case comprises an image.

5. The method of claim 1, wherein the test case comprises a 3-dimensional model.

6. The method of claim 1, wherein the third value is calculated by a processor based on category identifiers.

7. The method of claim 2, wherein the matching case and the first category related to the matching category have category identifiers separated by 1.

8. The method of claim 7, further comprising a fourth value for a second category related to the matching category for the test case, wherein the matching case and the second category related to the matching category have category identifiers separated by 1, the category identifiers of the first category and second category are separated by 2, and the third value differs from the fourth value.

9. The method of claim 1, wherein the control vector comprises a cost function that penalizes how far a first class is from a second class.

10. The method of claim 9, wherein penalties of the cost function are encoded into the control vector as a normalized probability distribution.

11. The method of claim 1, wherein comparing the answer vector against the control vector comprises determining a summed difference between the answer vector and the control vector.

12. The method of claim 11, wherein the summed difference is provided as feedback to the machine learning system to evaluate how well the machine learning system did in assessing the test case input.

13. The method of claim 1, further comprising adjusting the machine learning system to minimize differences between the answer vector and the control vector over a training set.

14. A category identification training system, comprising:
a processor and
a memory communicatively coupled to the processor, the memory containing instructions which when executed cause the processor to:
train a machine learning system in category identification, wherein the machine learning system outputs an answer vector and values in the answer vector correspond to categories, wherein the categories include a first category and a first subcategory in the first category and wherein the value in the answer vector corresponding to the subcategory determines whether the machine learning system identifies an output as the first sub category and does not identify the output as the first category.

15. The system of claim 14, wherein the categories and subcategories are extracted from a database.

16. The system of claim 14, further comprising supercategories, wherein the supercategories comprise groups of categories with a commonality.

17. The system of claim 14, wherein the categories and subcategories are extracted from an existing taxonomy.

18. A category identification system comprising:
a machine learning system comprising a processor and an associated memory;
wherein the machine learning system is trained against an answer vector,
wherein positions in the answer vector correspond to different cardinal directions and such that the values of the answer vector may be combined to generate an orientation.

19. The system of claim 18, wherein an input to the machine learning system is an image.

20. The system of claim 19, wherein the test cases comprise an image oriented in a cardinal direction and answer vector which includes a single value indicating a match to the cardinal direction orientation of the image and the remaining values of the answer vector indicating non-match to the remaining cardinal directions.

* * * * *